United States Patent Office 2,859,221
Patented Nov. 4, 1958

2,859,221

ACID ANTHRAQUINONE DYESTUFFS

Peter Hindermann, Batterie, Basel, Peter Trautzl, Basel, and Jean-Pierre Jung, Riehen, near Basel, Switzerland, assignors to J. R. Geigy A. G., Basel, Switzerland, a Swiss firm No Drawing. Application December 23, 1955
Serial No. 554,917

Claims priority, application Switzerland
December 31, 1954

8 Claims. (Cl. 260—373)

The present invention concerns reddish blue acid anthraquinone dyestuffs which are suitable for the dyeing of natural and synthetic polypeptide fibres. Due to their high affinity, they are particularly suitable for the dyeing of wool from a neutral to weakly acid bath. It also concerns processes for the production of the new acid wool dyestuffs. Further, it concerns dyeing processes for natural and synthetic polypeptide fibres using the new anthraquinone dyestuffs as well as, as industrial product, the polypeptide material fast dyed with the aid of these dyestuffs.

It has been found that very valuable acid anthraquinone dyestuffs which dye wool very fast in reddish-blue shades even from a neutral to weakly acid bath are obtained if anthraquinone derivatives having substituents which can be exchanged in the 1.4-position and which may also possibly be further substituted are reacted by methods known per se at a raised temperature with 6-alkyl-1-aminobenzene aryl ethers substituted in the 2-position of the amine substituted benzene ring by an alkyl or ether group, the amine containing benzene ring of which may possibly also contain further alkyl substituents, to form the corresponding 1.4-bis-phenylamino compounds, sulphonating these dye bases and converting the dyestuff sulphonic acids into the water soluble salts.

Examples of anthraquinone derivatives having substituents which can be exchanged in the 1- and 4-positions of the anthraquinone ring which are usable according to the present invention are e. g. the 1.4-dihalogen, the 1-halogen-4-nitro, the 1-halogen-4-hydroxy, the 1-alkoxy-4-halogen, the 1-hydroxy-4-nitro and, in particular, also the 1.4-dihydroxy anthraquinones. These anthraquinone derivatives can be still further substituted, preferably by non-ionogenic substituents, for example in the 6- and/or 7-position of the anthraquinone ring for example by fluorine, chlorine, bromine, arylthio and alkyl sulphonyl groups. 1.4-dichloro and, in particular dibromo anthraquinones as well as the 1.4-dihydroxy anthraquinones are particularly suitable, all of which can be further substituted as indicated.

The generic expressions "ether group" and "aryl ether group" are intended to embrace oxygen ethers as well as thio ethers in the definition of the present invention. In the 6-alkyl-1-aminobenzene aryl ethers which contain either an ether or an alkyl group in the 2-position of the amine-containing benzene ring, the alkyl substituents are advantageously methyl groups. Also, possibly higher alkyl groups, for example the ethyl group, the isopropyl group or hydrogenated rings linked in that position to the benzene ring can form the alkyl substituents. Advantageously, the aryl radical of the aryl ether group is a phenyl radical which can be further substituted non-ionogenically as desired, for example by halogen, alkyl, aralkyl, aryl, alkyl and aryl ether, alkyl and aryl sulphonyl, aliphatic or aromatic keto groups, or also a naphthyl radical, which latter also can be further substituted nonionogenically as desired. The 6-alkyl-1-aminobenzene aryl ethers used according to the present invention are new. They are obtained from the corresponding 6-alkyl-1-nitro-halogen benzene compounds by reacting with alkali metal phenolates, alkali metal naphtholates, alkali metal thiophenolates, alkali metal thionaphtholates, advantageously in the presence of an excess of hydroxyl compound or the sulphohydryl compound used, by heating to a fairly high temperature and then reducing the nitro group to the amino group. The 6-alkyl-1-nitro-halogen benzene compounds used as starting materials are obtained from the corresponding 6-alkyl-1-amino-2- or -4-halogen benzenes by diazotising and replacing the diazo group by the nitro group in the presence of potassium-cobalt nitrite by the usual methods. Thus, for example, 6-methyl-1-nitro-2-chlorobenzene and 4.6-dimethyl-1-nitro-2-chlorobenzene as well as 2.6-dimethyl-1-nitro-3- or -4-bromobenzene can be used which produce particularly valuable 6-alkyl-1-aminobenzene aryl ethers usable according to the present invention, for example, the 1-amino-2.6-dimethyl-4-phenoxy-, -4-phenylthio-, -4-(2'- or 3'- or 4'-methylphenoxy)-, -4-(4'-methylphenylthio)-, -4-(4'-chlorophenylthio)-, -4-(2'- or 3'- or 4'-chlorophenoxy)-, -4-(4'-tert. butylphenoxy)-, -4-(4'-tert. amylphenoxy)- -4 - (4' - benzylphenoxy)-, -4-(4'-phenylphenoxy)-, -4-(4'-phenoxyphenoxy)-, -4-(4'-btuyl- or -phenyl-sulphonylphenoxy)-, -4-(4'-acetyl- or -benzoyl-phenoxy)-benzene, as well as the corresponding 2.6-dimethyl-1-aminobenzene-3-aryl ethers, 6-methyl-1-aminobenzene-2-aryl ethers and 4.6-dimethyl-1-aminobenzene-2-aryl ethers, also the 6-methyl- and the 4.6-dimethyl-1-amino-2-(1'- or -2'-naphthyloxy)-benzenes and the 2.6-dimethyl-1-amino-4-(1'- or -2' - naphthyloxy)-benzenes.

The condensation with the anthraquinone derivatives having movable substituents in the 1- and 4-positions is performed by methods known per se, for example, by heating the components as a melt or in the presence of low fatty acids, higher boiling alcohols such as butanol or ethylene glycol monomethyl or monoethyl ether. It can also be performed possibly in the presence of agents which bind the mineral acid or which reduce the quinone to some extent as well as in the presence of copper containing catalysts or stabilisers containing boron. It is also possible to perform the condensation in steps by first replacing only one of the substituents which can be exchanged and then the other by aryloxy or arylthio-6-alkyl-1-phenylamide radicals.

The dye bases, which are possibly purified by recrystallisation, by which the 1.4-bis-(aryloxy- or arylthio-alkylphenylamino)-anthraquinones which, as stated above can be further substituted nonionogenically, are to be understood, are finally sulphonated by methods which are also known per se. In the sulphonation process care should be taken that, generally, not more than two sulphonic acid groups are introduced if an optimal drawing power onto wool from a neutral to weakly acid bath is desired. The sulphonation can be performed with concentrated sulphuric acid, with oleum, with chlorosulphonic acid, with sulphuric acid trioxide advantageously in the form of the addition product with pyridine or dioxan, possibly in inert solvents for the dye bases. Finally, the dyestuff sulphonic acids freed from accompanying substances are converted in aqueous suspension into the water soluble alkali or ammonium salts, e. g. into the lithium, sodium, potassium or ammonium salts. These alkali salts dissolve in both hot water and in concentrated sulphuric acid with a blue colour. They dye wool in a neutral to weakly acid bath in valuable reddish blue shades. The wool dyeings have very good wet and light fastness properties. The dyestuffs can also be used for the dyeing of other natural and synthetic polypeptide fibres, e. g. for the dyeing of silk, lanital fibres, superpolyamide and superpolyurethane fibres.

The following examples give more exact information regarding the production and use of the new acid anthraquinone dyestuffs. They serve, however, only to further illustrate the invention without limiting it in any way. Where not otherwise stated, parts are given as parts by weight and the temperatures are in degrees centigrade. Where parts by volume are expressly mentioned, their relationship to parts by weight is as that of litres to kilogrammes.

*Example 1*

A mixture of 15 parts of quinizarin, 9.1 parts of leuco-quinizarin, 9 parts of metaboric acid and 82.2 parts of 4-amino-3.5-dimethyl-1-phenoxybenzene are melted with 25 parts of glacial acetic acid and 3.5 parts of 30% hydrochloric acid and the thinly liquid melt is kept in a carbonic acid atmosphere at 110–115° for 30 hours. After this time, the condensation product has precipitated as a thick, crystalline mass. Some of it is in the leuco form. 200 parts of N-butyl alcohol, 4.2 parts of 30% caustic soda lye and 5 parts of sodium perborate are added at 80° to convert the product into the dye base and the reaction mixture is boiled for some hours under reflux until no more leuco compound is present. It is allowed to cool to room temperature and the crystalline bronze-gleaming 1.4-bis-(2'.6'-dimethyl-4'-phenoxyanilido)-anthraquinone of the formula:

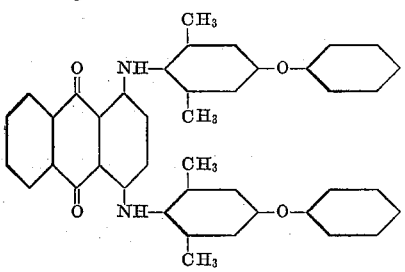

is drawn off under suction, washed with about 70° warm N-butyl alcohol and the amine adhering thereto is removed with warm, strongly diluted hydrochloric acid. The dried dye base is then sulphonated by methods known per se, for example by stirring 10 parts in 100 parts of concentrated sulphuric acid at 15–25° until a sample dissolves completely in a lot of hot water. The dyestuff is precipitated by diluting with water, drawn off under suction and converted into the sodium salt in the usual way, isolated and dried. It is a dark blue powder which dissolves in water and in concentrated sulphuric acid with a blue colour. It dyes wool, silk and polyamide fibres from a neutral bath in very fast reddish blue shades.

The same dyestuff is attained if instead of the mixture of 15 parts of quinizarin and 9.1 parts of leuco quinizarin, a mixture of 15 parts of 1-amino-4-hydroxyanthraquinone and 9.1 parts of the corresponding leuco compound is used.

Similar dyestuffs are obtained if in the above example, instead of 4-amino-3.5-dimethyl-1-phenoxybenzene, 105.2 parts of 4-amino-3.5-dimethyl-1-(1'- or -2'-naphthyloxy)-benzene are used and otherwise the same procedure is followed.

*Example 2*

100 parts of 4-amino-3.4'.5-trimethyldiphenyl oxygen ether are stirred at 170–180° with 27.7 parts of 1.4-dichloranthraquinone, 25 parts of potassium acetate, 0.1 part of copper powder and 0.1 part of copper acetate for 10 hours. The melt is then cooled to 60°, 300 parts of methyl alcohol are added and the whole is boiled under reflux for several hours. The crystalline condensation product, which is obtained in good yield, is filtered off and washed with warm methanol, strongly diluted hydrochloric acid and warm water. By recrystallising once from nitrobenzene, 1.4-bis-(2'.6'-dimethyl-4'-p-methylphenoxyanilido)-anthraquinone of the formula:

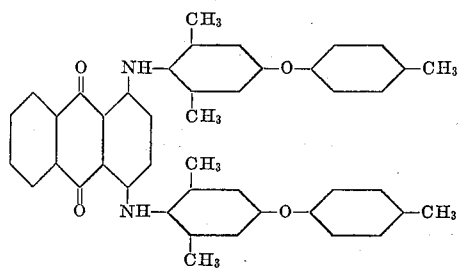

is obtained in fine blue-black, bronze-gleaming little needles. To sulphonate, the dye base is stirred in 5 to 10 times the amount of concentrated sulphuric acid at 20–25° until a sample dissolves completely in water. The product is stirred in ice water, the precipitated dye acid is filtered off under suction, again pasted in water, converted into the neutral sodium salt with caustic soda lye and isolated without salt at room temperature. When dry, the dyestuff is a dark blue powder which dissolves in water and in concentrated sulphuric acid with a blue colour. It dyes wool, synthetic polyamide fibres, charged and uncharged silk in reddish blue shades which are wet and light fast.

The same dyestuff is obtained also if, in the above example, 28.75 parts of 1-chloro-4-nitroanthraquinone or 27.25 parts of 1-methoxy-4-chloranthraquinone are used instead of 27.7 parts of 1.4-dichloranthraquinone.

Similar dyestuffs are obtained if, in the above example, instead of the aminodiphenyl ether used, 130 parts of 4-amino-3.5-dimethyl-1-(4'-benzylphenoxy)-benzene or the same number of parts of 4-amino-3.5-dimethyl-1-(4'-phenoxyphenoxy)-benzene are used and otherwise the same procedure is followed.

Also the condensation can be performed as described in Example 1 with a mixture of quinizarin and leuco quinizarin in the melt in the presence of boric acid.

*Example 3*

120 parts of 4-amino-3.5-dimethyl-4'-chlorodiphenyl oxygen ether, 24 parts of quinizarin, 30 parts of amyl alcohol and 8 parts of 30% hydrochloric acid are stirred at 90–95° during which process 2 parts of zinc dust are added in small portions within 20–30 minutes. After adding 5 parts of boric acid, the reaction mass is kept for 24 hours at 110–115°. A further 200 parts of N-amyl alcohol are then added and the whole is stirred for another hour at 60°. The condensation product which has precipitated in crystalline form is filtered off, washed with warm methyl alcohol, strongly diluted mineral acid and then with water. An excellent yield of 1.4-bis-(2'.6'-dimethyl-4'-p-chlorophenoxyanilido)-anthraquinone of the formula:

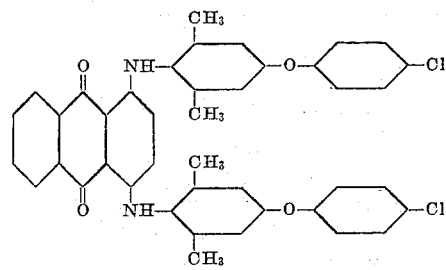

precipitates out. After drying, the base is added to 10 times the amount of concentrated sulphuric acid. The sulphonation mass is stirred at 20–30° until a sample dissolves completely in water. The dyestuff is isolated in the usual way and converted into the sodium salt. It is a dark blue powder which dissolves in water and in sulphuric acid conc. with a blue colour. It dyes wool, silk and polyamide fibres in very fast reddish blue shades and is distinguished by good drawing power from a neutral bath.

If 120 parts of 4-amino-3.5-dimethyl-4'-bromodiphenyl ether are condensed instead of 120 parts of 4-amino-3.5-dimethyl-4'-chlorodiphenyl ether, a similar dyestuff with good drawing power from a neutral bath is obtained.

Similar dyestuffs are also obtained if, in the above example, 150 parts of 4-amino-3.5-dimethyl-1-(4'-benzoylphenoxy)-benzene or 160 parts of 4-amino-3.5-dimethyl-1-(4'-phenyl sulphonyl phenoxy)-benzene are used instead of the aminodiphenyl ether used, and otherwise the same procedure is followed.

Example 4

15 parts of quinizarin, 9.1 parts of leuco quinizarin, 97.2 parts of 4-amino-3.4'.5-trimethyl diphenyl sulphide, 9 parts of metaboric acid are melted with 25 parts of glacial acetic acid and 3.5 parts of 30% hydrochloric acid in a nitrogen atmosphere and the melt is kept for 35 hours at 110–115°. During this time, the condensation product gradually precipitates in crystalline form. 200 parts of N-butyl alcohol, 5 parts of a 30% caustic soda lye and 5 parts of sodium perborate are added and the whole is boiled for some hours under reflux until the leuco compound is oxidised to the normal dye base. It is then allowed to cool to room temperature, the crystalline 1.4-bis-(2'.6'-dimethyl-4'-p-tolylmercaptoanilido)-anthraquinone of the formula:

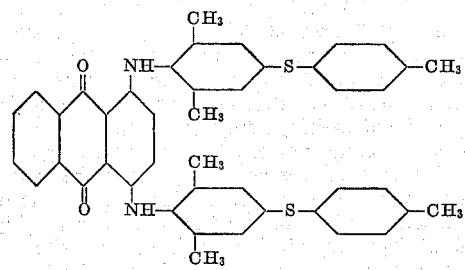

is drawn off under suction and washed first with about 70° warm N-butyl alcohol and then with warm, strongly diluted hydrochloric acid and finally with water. The dye base is then dried.

10 parts of the condensation product are stirred at 20–25° in 10 times the amount of concentrated sulphuric acid until a sample completely dissolves in a lot of hot water. The dyestuff is precipitated by pouring into ice water, the precipitate is filtered off, the filter cakes are dissolved in 500 parts of water, neutralised with sodium carbonate and the dyestuff is isolated as the sodium salt. It is a dark powder which dissolves in water and in concentrated sulphuric acid with a blue colour. The dyestuff has very good drawing power from a neutral bath. It dyes wool, synthetic polyamide fibres and silk in very fast blue shades.

If in the above example, 91.6 parts of 4-amino-3.5-dimethyldiphenyl sulphide or 102.8 parts of 4-amino-3.3'.4'.5-tetramethyldiphenyl sulphide or 114 parts of 4-amino-3.5-dimethyl-4'-n-butyldiphenyl sulphide are used instead of 97.2 parts of 4-amino-3.4'.5-trimethyl diphenyl sulphide, then similar blue dyestuffs which draw well from a neutral dyebath are obtained, the wool dyeings of which have good washing, milling and light fastness properties.

Example 5

15 parts of quinizarin, 9.1 parts of leuco quinizarin, 105.4 parts of 4-amino-3.5-dimethyl-4'-chlorodiphenyl sulphide and 9 parts of metaboric acid are condensed in the presence of glacial acetic acid and hydrochloric acid similar to the manner described in Example 4. The crystalline condensation product obtained is oxidised in N-butyl alcohol in the presence of sodium perborate to form 1.4-bis-(2'.6'-dimethyl-4'-p-chlorophenylmercaptoanilido)-anthraquinone of the formula:

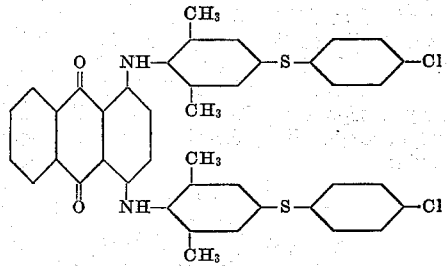

The dye base is obtained in fine dark, bronze-gleaming little needles by crystallisation from N-butyl alcohol. The dyestuff is sulphonated also as described in Example 4 and isolated in the form of the sodium salt. It is a dark powder which dissolves in water and in concentrated sulphuric acid with a blue colour. Blue dyeings are obtained on wool, silk and polyamide fibres in a neutral bath which are very fast to milling.

If the 105.4 parts of 4-amino-3.5-dimethyl-4'-chlorodiphenyl sulphide are replaced by 124 parts of 4-amino-3.5-dimethyl-4'-bromodiphenyl sulphide or by 119.2 parts of 4-amino-3.5-dimethyl-3'.4'-dichlorodiphenyl sulphide, then dyestuffs are obtained which dye wool and silk in similar fast blue shades.

Example 6

18 parts of 6-chloroquinizarin, 9.45 parts of leuco-6-chloroquinizarin, 100 parts of 4-amino-3.2'.5-trimethyldiphenyl oxygen ether, 9 parts of metaboric acid are condensed in a nitrogen atmosphere in 25 parts of N-amyl alcohol for 30 hours at 120–125°. The condensation product obtained is boiled under reflux for several hours while introducing air in order to convert the part of the condensation product which is in the leuco form into the anthraquinone of the formula:

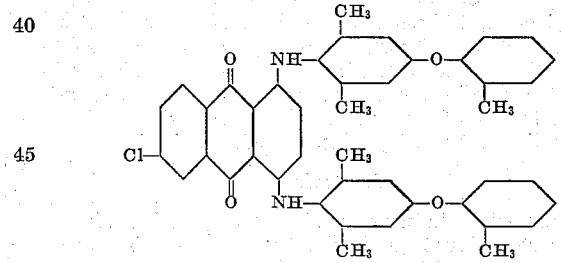

The crystalline precipitate is then drawn off hot under suction and recrystallised once from nitrobenzene. The crystalline, bronze-gleaming dye base obtained is sulphonated in 5 to 10 times the amount of concentrated sulphuric acid at 15–25° until a sample completely dissolves in a lot of hot water. The dye base is then poured into ice water and the dyestuff is isolated in the usual way as sodium salt and dried. It is a dark powder which dissolves in water and in concentrated sulphuric acid with a blue colour. It dyes wool, silk, and polyamide fibres from a neutral bath in blue shades which are fast to light and milling.

If instead of the mixture of 18 parts of 6-chloroquinizarin and 9.45 parts of leuco-6-chloroquinizarin, a mixture of 20 parts of 6-bromoquinizarin and 11.9 parts of leuco-6-bromoquinizarin or a mixture of 17 parts of 6-fluoroquinizarin and 8.8 parts of leuco-6-fluoroquinizarin is used, then similar blue dyestuffs which draw well from a neutral bath and are fast to milling are obtained.

Example 7

A mixture made up from 20 parts of 6.7-dichloroquinizarin and 11 parts of leuco-6.7-dichloroquinizarin, 9 parts of metaboric acid and 100 parts of 4-amino-3.3'.5-trimethyldiphenyl oxygen ether is melted with 25 parts of glacial acetic acid and 3.5 parts of 30% hydrochloric acid and the melt is stirred for 35 hours at 110–115° in a carbonic acid atmosphere. 300 parts of ethyl alcohol are then added at 70° to the thick liquid crystal broth, 4.2 parts of 30% caustic soda lye and 5 parts of sodium perborate are added and the whole mixture is boiled for some hours under reflux, until the leuco compound completely disappears. The 1.4-bis-(2'.6'-dimethyl-4'-m-methylphenoxy-anilido)-6.7-dichloranthraquinone of the formula:

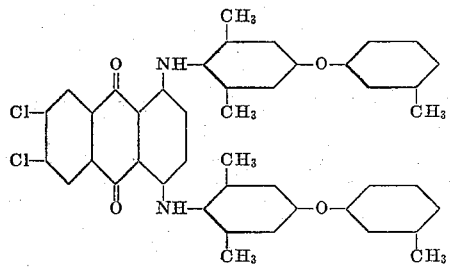

obtained in crystalline form is drawn off hot under suction, washed with warm ethyl alcohol, hot diluted hydrochloric acid and then with warm water and dried. The dye base in the form of a bronzy dark crystal powder is obtained by crystallisation from nitrobenzene. To sulphonate, the dye base is stirred at 15–30° in 10 times the amount of concentrated sulphuric acid until a sample is completely soluble in a lot of hot water. It is then pasted into ice water, the precipitated dye acid is drawn off under suction, again pasted in water and converted into the neutral sodium salt of the dyestuff with sodium carbonate. The sodium salt is isolated at room temperature without the addition of salt. It is a dark blue powder which dissolves in water and in concentrated sulphuric acid with a blue colour and dyes wool, charged or uncharged silk in reddish-blue shades which are fast to wet and light.

If instead of 100 parts of 4-amino-3.3'.5-trimethyldiphenyl ether, 106 parts of 4-amino-3.3'.5.5'-tetramethyldiphenyl ether, 118 parts of 4-amino-3.5-dimethyl-4'-isopropyldiphenyl ether or 113 parts of 4-amino-3.5-dimethyl-4'-methoxydiphenyl ether are condensed, then dyestuffs which dye wool from a neutral bath in blue shades of corresponding wet and light fastness are obtained.

*Example 8*

A mixture of 12 parts of 1.4-dihydroxy anthraquinone, 12.1 parts of leuco quinizarin, 9 parts of metaboric acid and 79.6 parts of 3-methyl-2-amino-1-phenoxybenzene is melted with 25 parts of glacial acetic acid and 3.5 parts of 30% hydrochloric acid and the thin liquid melt is kept for 30 hours at 110–115° in a carbonic acid atmosphere. After this time, the condensation product has precipitated as a thick crystalline mass. Some of it is in the leuco form. To convert into the dye base, 200 parts of N-butyl alcohol and 4.2 parts of 30% caustic soda lye are added at 90° and air is introduced through the reaction mixture at 90–100° for some hours until the leuco compound has disappeared. It is allowed to cool to room temperature and the crystalline, bronzy 1.4-bis-(2'-phenoxy-6'-methylanilido)-anthraquinone of the formula:

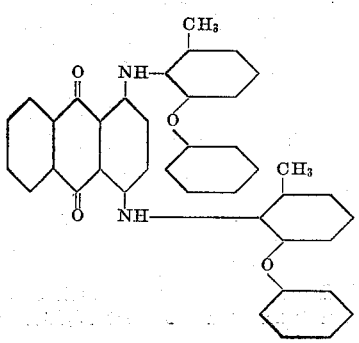

is drawn off under suction. After washing the filter residue with hot methyl alcohol, the dyestuff base is obtained in a pure form. The dried dye base is then sulphonated by the usual methods, for example by stirring 10 parts in 100 parts of concentrated sulphuric acid at 15–20° until a sample dissolves completely in a lot of hot water. The dyestuff is precipitated by dilution with water, drawn off under suction and converted in the usual way into the sodium salt, isolated and dried. It is a dark blue powder which dissolves in water and in concentrated sulphuric acid with a blue colour and dyes wool, silk and polyamide fibres from a neutral bath in the presence of ammonium sulphate in very fast reddish blue shades.

If instead of 79.6 parts of 3-methyl-2-amino-1-phenoxybenzene, 85.2 parts of 2-amino-3.2'- or -3.3'- or -3.4'-dimethyldiphenyl oxygen ether or 93.4 parts of 3-methyl-2-amino-4'-chloro-1-phenoxybenzene or 91.6 parts of 3-methyl-2-amino-1-(4'-methoxyphenoxy)-benzene or 115.6 parts of 3-methyl-2-amino-1-(4'-benzylphenoxy)-benzene or 116.4 parts of 3-methyl-2-amino-1-(4'-phenoxyphenoxy)-benzene or 121.2 parts of 3-methyl-2-amino-1-(4'-benzoylphenoxy)-benzene or 99.6 parts of 3-methyl-2-amino-1-(1'- or -2'-naphthoxy)-benzene are condensed, then similar dyestuffs which draw well from a neutral bath are obtained.

*Example 9*

12 parts of 33% hydrochloric acid are added at 80–90° to a melt of 24 parts of 1.4-dihydroxy anthraquinone, 90.8 parts of 2-amino-3.4'.5-trimethyl-1-phenoxybenzene and 25 parts of glacial acetic acid and then 3.3 parts of zinc dust are added in small even portions within 10 minutes. Then 9 parts of metaboric acid are added and the thin liquid melt is kept for 24 hours at 110–115°. After this time, the condensation product has precipitated as a thick, crystalline mass. To convert the part of the dye base which is in the leuco form, 200 parts of sec. butyl alcohol and 10 parts of 30% caustic soda lye are added at 85° and air is introduced into the reaction mixture for some hours at 85–90° until the leuco compound has disappeared. It is cooled to room temperature and the crystalline, bronze-gleaming 1.4-bis-anilido anthraquinone of the formula:

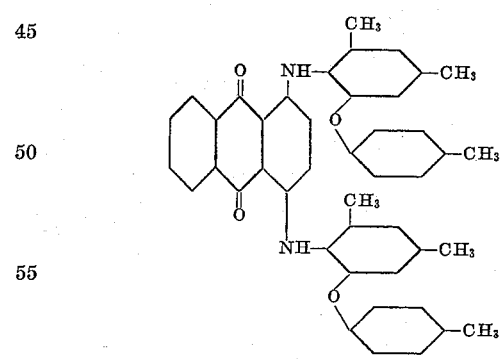

is drawn off under suction. It is washed with hot sec. butyl alcohol, strongly diluted mineral acid and water and dried. The dye base is obtained in good yield and purity.

10 parts of this condensation product are added to 100 parts of sulphuric acid and the whole is stirred at 15–30° until a sample dissolves completely in water. The sulphonation mass is then stirred into a mixture of ice and water, the precipitate is filtered off, the filter cakes are dissolved in 500 parts of water, neutralised with sodium carbonate and the dyestuff is isolated as sodium salt with sodium chloride. It is a dark powder which dissolves in water and in concentrated sulphuric acid with a blue colour. The dyestuff dyes wool and silk from a neutral bath in blue shades which have good fastness to milling, sea water and light.

If instead of the 90.8 parts of 2-amino-3.4'.5-trimethyl-1-phenoxybenzene, 96.4 parts of 2-amino-3.3'.5.5'-tetramethyl-1-phenoxybenzene or 115.6 parts of 2-amino-3.5-dimethyl-1-(4'-phenylphenoxy)-benzene or 141.2 parts of 2 - amino - 3.5 - dimethyl - 1 - (4' - phenylsulphonylphenoxy) - benzene or 97.2 parts of 2 - amino - 3.4'.5-trimethyl - 1 - thiophenoxybenzene or 105.4 parts of 2-amino - 3.5 - dimethyl - 1 - (4' - chlorothiophenoxy)-benzene are used then similar blue dyestuffs which draw well from a neutral bath are obtained, the wool dyeings of which have good fastness to washing, milling and light.

Example 10

A mixture of 12 parts of 1.4-dihydroxyanthraquinone, 12.1 parts of leuco quinizarin, 9 parts of metaboric acid and 82.2 parts of 3 - amino - 2.4 - dimethyl - 1 - phenoxybenzene is melted with 25 parts of glacial acetic acid and 3.5 parts of 30% hydrochloric acid, and the thin liquid melt is kept at 110–115° for 30 hours in a nitrogen atmosphere. After this time, the condensation product has precipitated as a thick crystalline mass. Some of it is in the leuco form. To convert into the dye base, 200 parts of sec. butyl alcohol and 4.2 parts of 30% caustic soda lye are added at 90° and air is introduced into the reaction mixture for some hours at 90–100° until there is no more leuco compound present. The reaction mixture is cooled to room temperature and the crystalline, bronze - gleaming 1.4 - bis - (3' - phenoxy - 2'.6' - dimethylanilido)-anthraquinone of the formula:

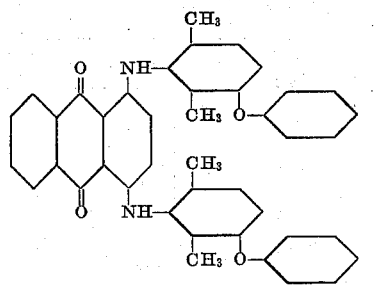

is drawn off under suction. The dye base is obtained in a pure form by washing the filter residue with hot methyl alcohol. The dried dye base is then sulphonated by the usual methods, for example by stirring 10 parts in 100 parts of concentrated sulphuric acid at 15–20° until a sample dissolves completely in a lot of hot water. The dyestuff is precipitated by dilution with water, drawn off under suction and converted in the usual way into the sodium salt, isolated and dried. It is a dark blue powder which dissolves in water and in concentrated sulphuric acid with a blue colour and dyes wool, silk and polyamide fibres from a neutral bath in the presence of ammonium sulphate in very fast reddish blue shades.

If instead of 82.2 parts of 3-amino-2.4-dimethyl-1-phenoxybenzene, 90.8 parts of 3-amino-2.4.4'-trimethyl-1-phenoxybenzene are condensed, then a similar dyestuff which draws well from a neutral bath is obtained.

Example 11

100 parts of wool flannel are entered at 40–45° into a dyebath consisting of 1 part of the dyestuff according to example 2, 3 parts of ammonium sulphate or 5 parts of ammonium acetate and 10 parts of Glaubers salt in 3000 parts of water. The bath is gradually brought to the boil within 45 minutes, kept at the light boil for half an hour and then the dyed goods are rinsed. A very level reddish blue wool dyeing is obtained which has very good fastness to milling, sea water and light.

Similar dyeings are obtained if dyestuffs according to the other examples are used under the same conditions.

What we claim is:

1. An acid dyestuff of the anthraquinone series having the general formula:

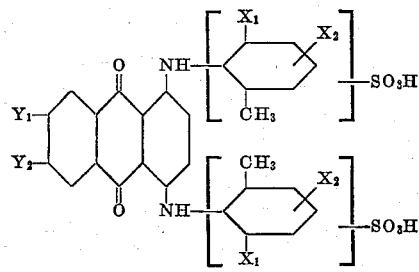

wherein one of $X_1$ and $X_2$ represents a member selected from the group consisting of phenyloxy, phenylthio and naphthyloxy radicals and the other one represents a member selected from the group consisting of hydrogen and the methyl group, $Y_1$ and $Y_2$ each represent a member selected from the group consisting of hydrogen and halogen, and wherein $X_1$ is always different from hydrogen.

2. An acid dyestuff of the anthraquinone series having the general formula:

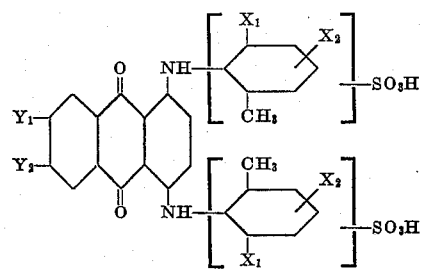

wherein $X_1$ represents a member selected from the group consisting of phenyloxy, phenylthio and naphthyloxy radicals, $X_2$ represents a member selected from the group consisting of hydrogen and the methyl group, $Y_1$ and $Y_2$ each represent a member selected from the group consisting of hydrogen and halogen.

3. An acid dyestuff of the anthraquinone series having the general formula:

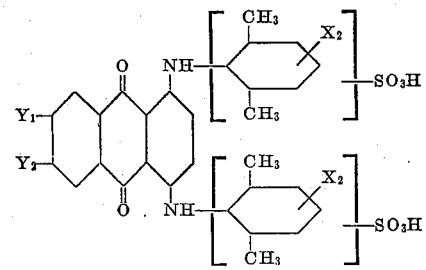

wherein $X_2$ represents an aryl ether substituent selected from the group consisting of phenyloxy, phenylthio and naphthyloxy radicals, $Y_1$ and $Y_2$ each represent a member selected from the group consisting of hydrogen and halogen.

4. An acid dyestuff of the anthraquinone series having the formula:

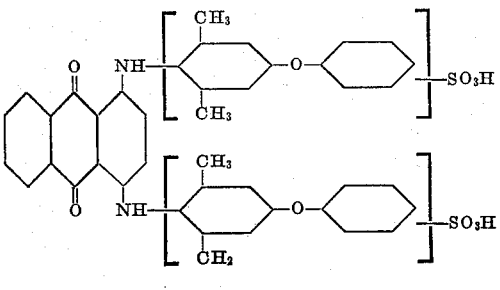

5. An acid dyestuff of the anthraquinone series having the formula:

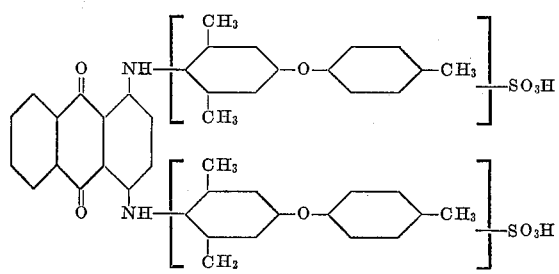

6. An acid dyestuff of the anthraquinone series having the formula:

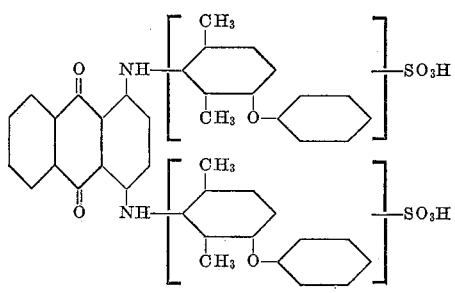

7. An acid dyestuff of the anthraquinone series having the formula:

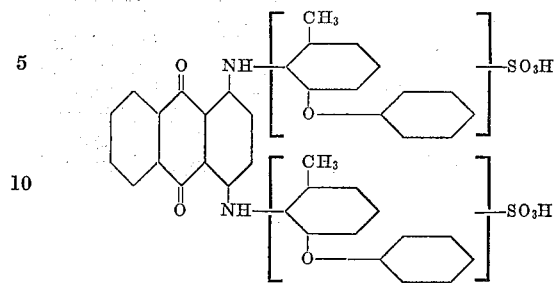

8. An acid dyestuff of the anthraquinone series having the formula:

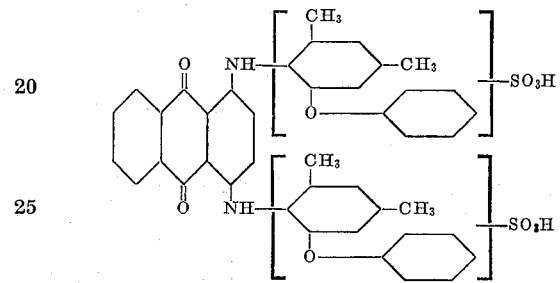

References Cited in the file of this patent
UNITED STATES PATENTS

| | | |
|---|---|---|
| 2,158,473 | Mettler | May 16, 1939 |
| 2,253,828 | Allmen et al. | Aug. 26, 1941 |
| 2,760,967 | Hindermann et al. | Aug. 28, 1956 |